No. 798,735. PATENTED SEPT. 5, 1905.
J. L. KUNZ.
POWER TRANSMITTING GEARING.
APPLICATION FILED FEB. 13, 1901.

5 SHEETS—SHEET 3.

Witnesses:
Geo. W. Young.
Chas. L. Goss.

Inventor:
John L. Kunz,
By Winkler Flanders Smith Bottum & Vilas
Attorneys

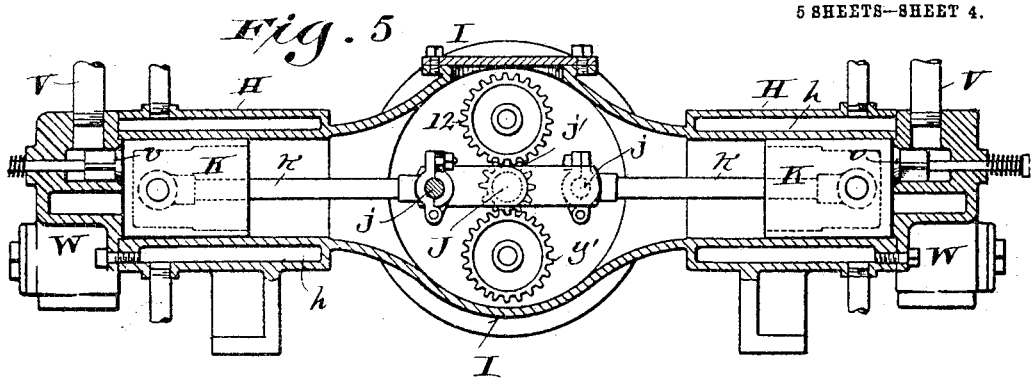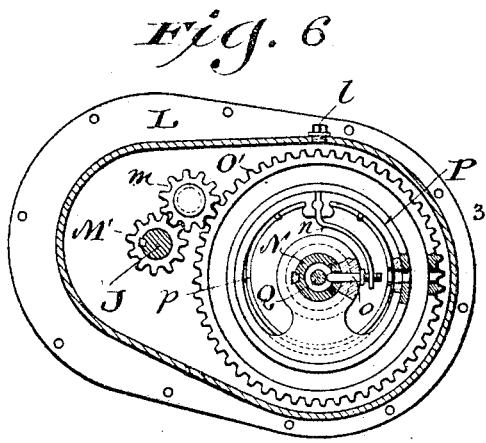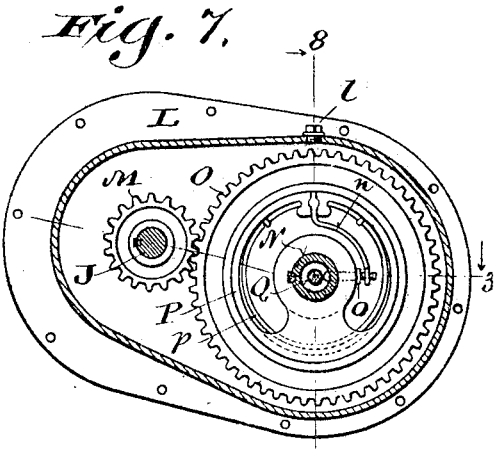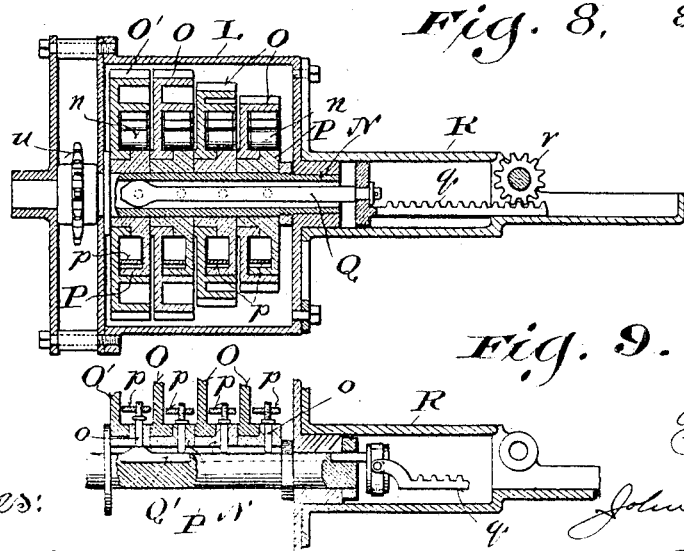

No. 798,735. PATENTED SEPT. 5, 1905.
J. L. KUNZ.
POWER TRANSMITTING GEARING.
APPLICATION FILED FEB. 13, 1901.

6 SHEETS—SHEET 5.

Witnesses:
Geo. W. Young.
Chas. L. Goss.

Inventor:
John L. Kunz.
By Wrigley Rhodes Smith Botha Vibes
Attorneys

UNITED STATES PATENT OFFICE.

JOHN L. KUNZ, OF MILWAUKEE, WISCONSIN, ASSIGNOR TO KUNZ AUTOMOBILE AND MOTOR COMPANY, OF MILWAUKEE, WISCONSIN.

POWER-TRANSMITTING GEARING.

No. 798,735.      Specification of Letters Patent.      Patented Sept. 5, 1905.

Application filed February 13, 1901. Serial No. 47,108.

*To all whom it may concern:*

Be it known that I, JOHN L. KUNZ, a citizen of the United States, residing at Milwaukee, in the county of Milwaukee and State of Wisconsin, have invented certain new and useful Improvements in Power-Transmitting Gearing, of which the following is a specification, reference being had to the accompanying drawings, forming a part thereof.

This invention relates more particularly to power-transmitting gearing for automobiles. Its main objects are to produce simple and compact reversing and speed-changing mechanism adapted to be mounted upon a motor-casing and directly connected with the driving-shaft of the motor and with the running-gear of a vehicle, to provide for easily and quickly adjusting the clutch-operating connections to compensate for wear and to take up play, and generally to improve the construction and operation of gearing of this class.

The invention consists in certain novel features in the construction and arrangement of parts, as hereinafter particularly described, and pointed out in the claims.

In the accompanying drawings like characters designate the same parts in the several figures.

Figure 1:
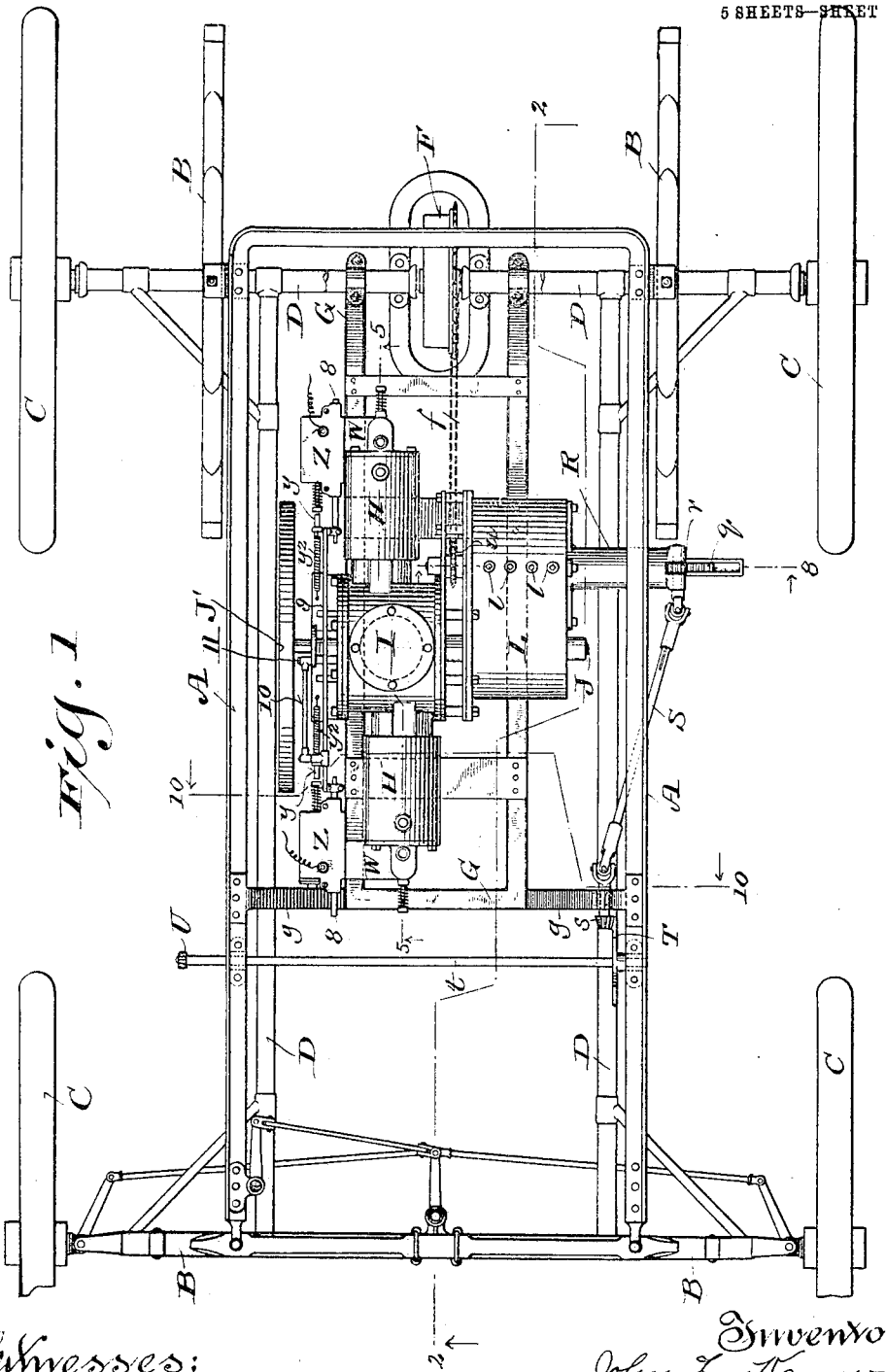
Figure 2:
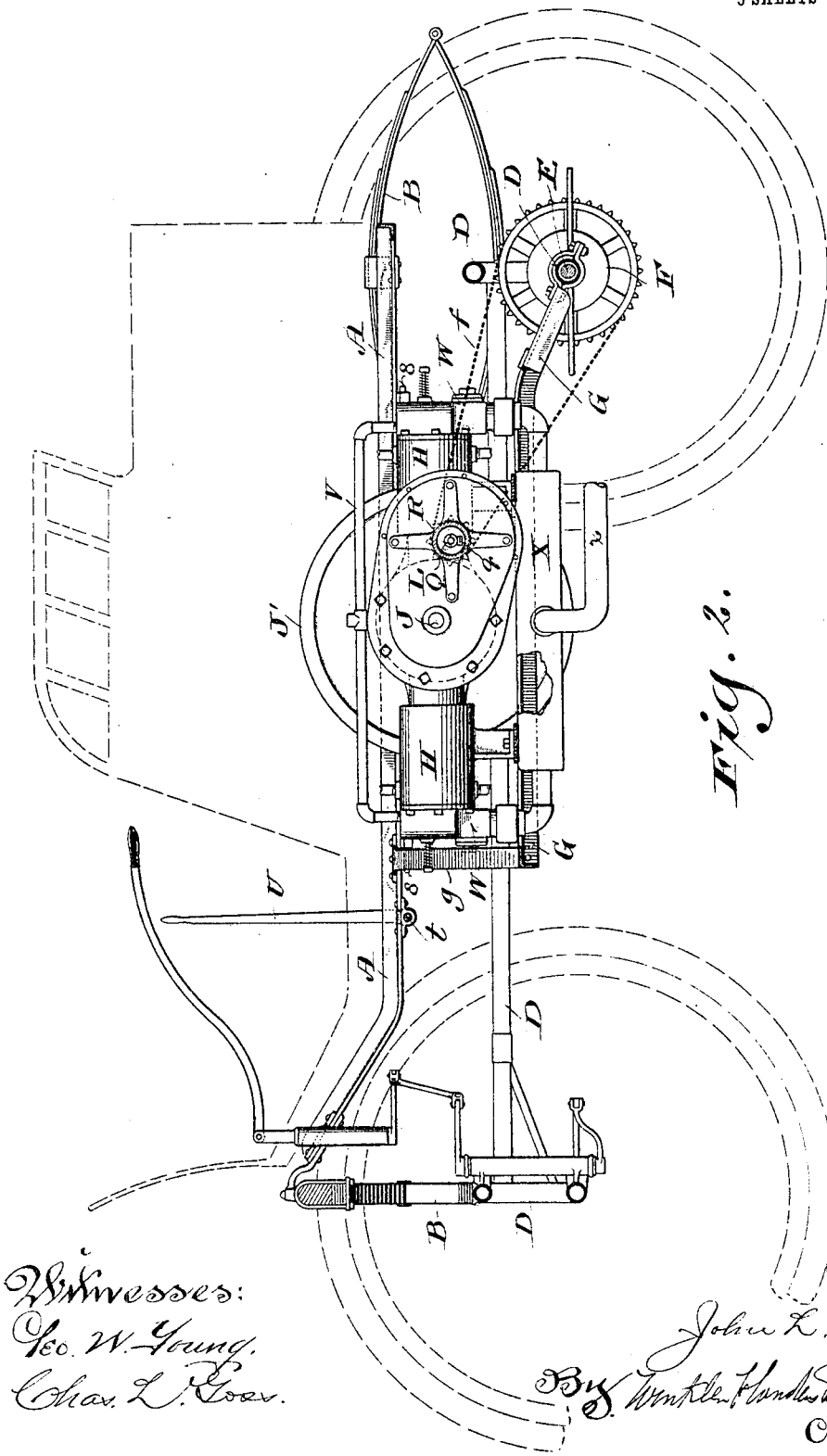
Figure 3:
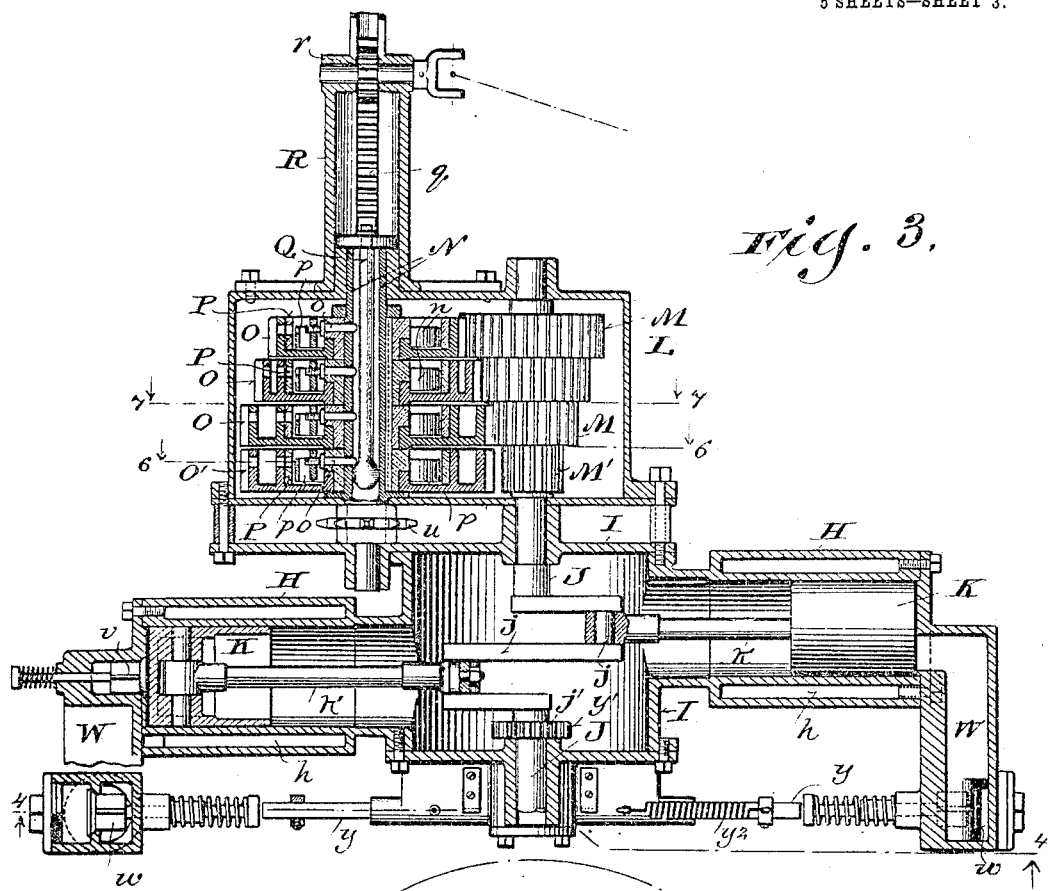
Figure 4:
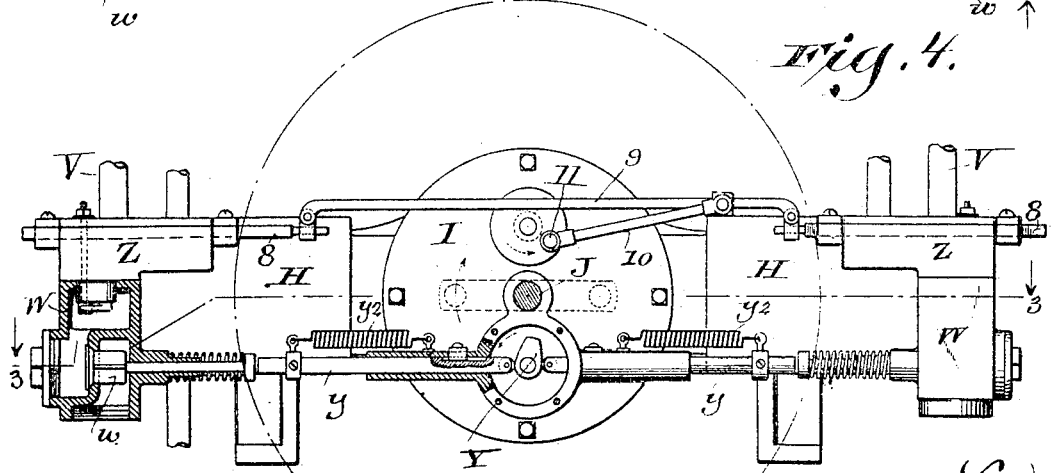
Figure 10:
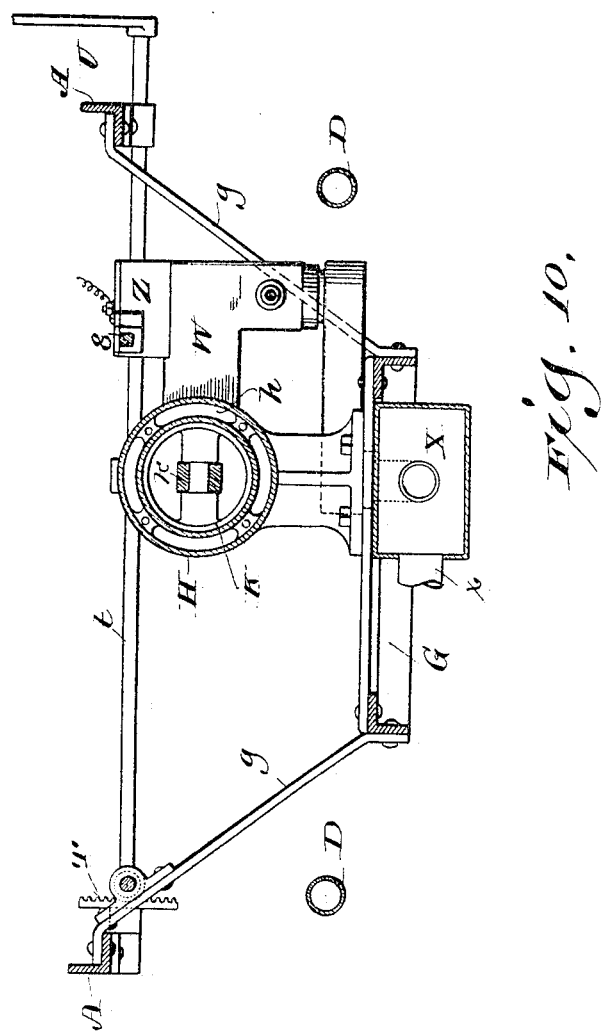

Figure 1 is a plan view of the running-gear, motor, and driving connections of a motor-vehicle. Fig. 2 is a side elevation and vertical longitudinal section of the same on the line 2 2, Fig. 1. Fig. 3 is an enlarged horizontal section on the lines 3 3, Figs. 4 and 7, of the motor, including the reversing and speed-changing mechanism. Fig. 4 is a side elevation and vertical longitudinal section on the line 4 4, Fig. 3. Fig. 5 is a vertical longitudinal section on the line 5 5, Fig. 1, through the cylinders and crank-case of the motor. Figs. 6 and 7 are sections on the lines 6 6 and 7 7, respectively, Fig. 3. Fig. 8 is a vertical section on the line 8 8, Fig. 7. Fig. 9 is a sectional view similar to that of Fig. 8, showing a modification of the clutch-operating device in the reversing and speed-changing gearing; and Fig. 10 is an enlarged vertical cross-section on the line 10 10, Fig. 1.

Referring to Figs. 1 and 2, illustrating the motor as mounted upon and connected with a vehicle, A designates the main frame, which carries the body (indicated by dotted lines in Fig. 2) and is supported by springs B B, carried by the running-gear, comprising the usual wheels C C, frame D, and axles. The rear axle E is divided, its two parts being incased and adapted to turn in tubular sections of the frame D. F designates a sprocket wheel and case containing any suitable form of compensating gears for connecting the motor with the parts of the rear axle and allowing either of the driving-wheels C to turn faster or slower than the other. G is an auxiliary frame or support for the motor. It is hinged at its rear end to the frame D concentric with the axle E, and at its front end it is pivotally suspended by brackets *g* from the body or main frame A. The motor is mounted upon this auxiliary frame G and is directly connected by a chain belt *f* with the sprocket-wheel F and compensating gear on the rear axle.

Referring to Figs. 3 and 5 in connection with Figs. 1 and 2, the motor consists generally of two cylinders H H, formed with or attached at their inner ends to a crank-casing I, a crank-shaft J, having bearings in the ends of said casing and formed or provided within it with cranks *j j*, which are connected by rods *k k* directly with the trunk-pistons K K, and reversing and speed-changing gearing inclosed in a casing L, which is bolted to one end of the casing I. The crank-shaft J extends through and has a bearing in the outer end of the casing L, and within said casing is provided with gears M of different sizes fixed thereon. Upon a tubular shaft N, parallel with the shaft J, are loosely mounted within the casing L a number of gears O, directly meshing with the gears M, and a gear O', which is connected through an idle gear *m*, as shown in Fig. 6, with a small gear or pinion M' on the crank-shaft. Upon the shaft N are fixed expansible friction-wheels P, which correspond in number and arrangement with the loose gears O O'. They have split or severed rims, which are fitted within corresponding rims on the gears O O', so that when they are expanded they will lock said gears upon said shaft N. The rims of these friction-wheels are contracted and normally held out of operative engagement with the loose gears by springs *p*, as shown in Figs. 6 and 7. *n* represents levers fulcrumed between the severed ends of the rims of the friction-wheels P and adapted when turned outwardly at their inner ends to spread said rims into fast frictional engagement with the rims of the loose gears. *o o* are pins passing loosely through the hubs of the friction-wheels P into the bore of the tubular shaft N and provided at their outer ends with heads which are adapted to engage with adjusting-screws in the inner ends of the levers $n$. These screws are for the purpose of taking up wear and are reached with a screw-driver through holes in the rims of the friction-wheels P and of the gears O O' when said holes are brought into line with each other, as shown in Figs. 3 and 6, and into line with holes in the top of the casing L. These holes in the casing L are ordinarily closed by screw-plugs $l$. The inner end of the shaft N and the casing or bearing through which it projects may be marked to indicate when the holes in the rims of the friction-wheels P are in line with the holes in the top of casing L. It is then an easy matter by turning the crank-shaft J to bring the holes in the gears O O' into line with the holes in said casing and friction-wheels, so that the screws in the levers $n$ may be adjusted by the insertion of a screw-driver. The expansible friction-wheels P, with their operating connections above described, constitute friction-clutches for locking the loose gears on the shaft N.

Q is a rod guided and movable endwise in the bore of the tubular shaft N. It is formed or provided at its inner end with an enlargement, which by engagement with the inner ends of the pins $o$ is adapted to turn the inner ends of the levers $n$ outward, and thereby expand the rims of the friction-wheels P one at a time into fast engagement with the loose gears O O'. The rod Q has a swivel connection at its outer end with a rack $q$, which is guided in a housing R, attached to the outer end of the casing L, as shown in Figs. 3 and 8. The rack $q$ is engaged by a pinion $r$, fixed on a short shaft journaled in said housing transversely thereto. The shaft of this pinion is connected, as shown in Fig. 1, by a universally jointed and extensible rod S with a short parallel shaft having a bearing in one of the hangers $g$, as shown in Figs. 1 and 10, and provided with a bevel-pinion $s$. This pinion is engaged by a bevel-gear T on a rock-shaft $t$, carried by the main frame A transversely thereto and provided with a lever-arm U within convenient reach of the operator sitting in the vehicle. The jointed and extensible connecting-rod S allows for variation in the relative positions of the main frame A, which carries the lever-arm U, and the motor-supporting frame G, which carries the rack and pinion $q$ and $r$. Other means than those hereinbefore described for turning said rod S may be employed.

The shaft N is provided at its inner end between the crank-casing I and the gear-casing L, as shown in Fig. 8, with a sprocket-wheel $u$, which is connected, as shown in Figs. 1 and 2, by the chain belt $f$ with the sprocket-wheel F and compensating gear on the rear axle E.

V is the supply-pipe, which connects the inlet-valve chambers at the outer ends of the cylinders H with a suitable carbureter and oil-reservoir. (Not shown.)

$v\ v$ are inwardly-opening inlet-valves normally closed by springs on their stems, as shown in Fig. 5.

W W are explosion-chambers and exhaust-passages communicating with the outer ends of the cylinders H and extending horizontally outward therefrom and then downward, as shown in Figs. 1, 3, 4, and 10. They are connected at their outer and lower ends with a box X, attached to the under side of the frame G, to muffle the exhaust. From one side of this muffle-box X an exhaust-pipe $x$ leads toward the rear of the vehicle, as shown in Figs. 2 and 10. In the downward bends of the exhaust-passages are located the exhaust-valves $w\ w$, which close toward the crank-shaft of the motor and are normally held on their seats by springs, as shown in Figs. 3 and 4. They are opened at the proper times by sliding rods $y\ y$, which are actuated by a cam Y on a short shaft below and parallel with the crank-shaft and connected therewith by gears $j''$ and $y'$, as shown in Figs. 3, 4, and 5. The rods $y$ are retracted toward the cam Y by springs $y^2$.

The gas or mixture of oil-vapor and air, which is supplied through the pipe V to the cylinders H and is compressed by alternate outward strokes of the pistons K in the chambers W, is ignited at the proper times by the separation of contact-pieces and the production of electric sparks in said chambers.

The engine is of the four-cycle type, the charges being compressed and exploded and the spent gases discharged on alternate outward strokes of each piston. The gear $y'$ and the gear 12, which operate the igniting mechanism through crank 11, connected by a link 10 and rod 9 with rods 8, as shown in Figs. 1, 4, and 5, are therefore made in the ratio of two to one with respect to the gear $j''$, by which they are driven. The cylinders H are formed, as usual in explosive-engines, with water-jackets $h$, through which cooling-water is circulated to prevent overheating. The crank-shaft J is preferably provided at the end opposite the reversing and speed-changing gearing with a balance-wheel J', as shown in Figs. 1 and 2.

In place of the tubular shaft N in the reversing and speed-changing gearing a solid shaft N', having a groove in one side, may be substituted, as shown in Fig. 9. In this groove is movably fitted a clutch-operating rod Q', which has a projection adapted to engage with the inner ends of the pins $o$. At its outer end this rod is attached to a grooved disk which is coaxial with the shaft N' and with which the rack $q$ is connected by a collar.

Various changes in the details of construction and arrangement of parts may be made within the spirit and intended scope of my invention.

I claim—

1. The combination of parallel driving and driven shafts, gears of different sizes fixed on one of said shafts, gears loosely mounted on the other shaft in mesh with the fixed gears, clutches for locking the several loose gears on the last-mentioned shaft, an axially-movable clutch-operating rod, a rack and pinion for operating said rod, and a universally jointed and extensible rod connected with said pinion and affording means for turning the same from a relatively movable point, substantially as described.

2. The combination with the casing and driving-shaft of a motor of a gear-casing attached to and carried by the motor-casing, the driving-shaft of the motor extending from the motor-casing into the gear-casing, speed-changing gearing inclosed in said gear-casing and comprising a shaft parallel with said driving-shaft, gears of different sizes fixed upon one of said shafts, gears loosely mounted upon the other shaft and meshing with the fixed gears, and means for locking the loose gears one at a time upon the shaft which carries them, substantially as described.

3. The combination with the crank-shaft and casing of a motor, of reversing and speed-changing gearing consisting of a shaft parallel with the crank-shaft, gears of different sizes fixed on one of said shafts, gears loosely mounted upon the other shaft, an idle gear connecting one of the loose gears with one of the fixed gears, the other loose gears meshing directly with the other fixed gears, and means for locking the loose gears one at a time on the shaft which carries them, a casing inclosing said gearing attached to and carried by the motor-casing, and provided with bearings for said shafts, a space being left between the motor and gear casings, and a power-transmitting wheel mounted on the parallel shaft in said space, substantially as described.

4. The combination of parallel driving and driven shafts, gears of different diameters fixed on one of said shafts, gears loosely mounted on the other shaft in mesh with the fixed gears, expansible friction-wheels fitted within said loose gears and fixed on the shaft which carries them, levers for expanding said friction-wheels provided with adjusting-screws, the rims of the loose gears having holes arranged to be brought into line with corresponding holes in the friction-wheels and with said screws, and means adapted to be moved into engagement with said screws to operate said levers and to lock each of said friction-wheels with the corresponding loose gear, substantially as described.

5. The combination of parallel driving and driven shafts, gears of different diameters fixed on one of said shafts, corresponding gears loosely mounted on the other shaft in mesh with the fixed gears, expansible friction-wheels fixed on the last-mentioned shaft and adapted when expanded to lock the loose gears thereon, levers for expanding said friction-wheels provided transversely at their inner ends with adjusting-screws, radial pins passing loosely through the hubs of said friction-wheels in line with the adjusting-screws in said levers, and a rod movable lengthwise in the shaft which carries said friction-wheels and having an enlargement which is adapted to force said pins outwardly, the rims of the loose gears and their associated friction-wheels having holes adapted to be brought into line with each other and with the associated adjusting-screws, substantially as described.

6. In a motor-vehicle the combination of parallel driving and driven shafts, gears of different diameters fixed on one of said shafts, corresponding gears loosely mounted on the other shaft in mesh with the fixed gears, clutches for locking the several loose gears on the shaft which carries them, an axially-movable clutch-operating rod, a rack and pinion for operating said rod, a hand-lever, and a universally jointed and extensible rod connecting said hand-lever with said pinion, substantially as described.

In witness whereof I hereto affix my signature in presence of two witnesses.

JOHN L. KUNZ.

Witnesses:
ALICE E. GOSS,
CHAS. L. GOSS.